(12) United States Patent
Fang et al.

(10) Patent No.: US 7,453,794 B2
(45) Date of Patent: Nov. 18, 2008

(54) CHANNEL ESTIMATION AND SYNCHRONIZATION WITH PREAMBLE USING POLYPHASE CODE

(75) Inventors: Yuguang Fang, Gainesville, FL (US); Byung-Seo Kim, Gainesville, FL (US)

(73) Assignee: University of Florida Research Foundation, Inc., Gainesville, FL (US)

( * ) Notice: Subject to any disclaimer, the term of this patent is extended or adjusted under 35 U.S.C. 154(b) by 884 days.

(21) Appl. No.: 10/737,339

(22) Filed: Dec. 16, 2003

(65) Prior Publication Data

US 2005/0128938 A1    Jun. 16, 2005

(51) Int. Cl.
*H04J 11/00*    (2006.01)
(52) U.S. Cl. .......................... 370/210; 370/208
(58) Field of Classification Search ................. 370/208, 370/210, 203, 350, 260, 281, 392, 393, 474, 370/475, 476, 480, 479
See application file for complete search history.

(56) References Cited

U.S. PATENT DOCUMENTS

| | | | | |
|---|---|---|---|---|
| 6,246,735 | B1* | 6/2001 | Sano et al. | 375/364 |
| 6,658,063 | B1* | 12/2003 | Mizoguchi et al. | 375/260 |
| 6,934,340 | B1* | 8/2005 | Dollard | 375/260 |
| 7,085,223 | B2* | 8/2006 | Izumi | 370/204 |
| 7,218,693 | B2* | 5/2007 | Troulis | 375/346 |
| 2002/0172146 | A1* | 11/2002 | Wu et al. | 370/208 |
| 2002/0181389 | A1* | 12/2002 | Giannakis et al. | 370/208 |
| 2002/0181549 | A1* | 12/2002 | Linnartz et al. | 375/142 |
| 2003/0039317 | A1* | 2/2003 | Taylor et al. | 375/295 |
| 2003/0171128 | A1* | 9/2003 | Tandai et al. | 455/502 |
| 2004/0047368 | A1* | 3/2004 | Xu | 370/509 |
| 2004/0131011 | A1* | 7/2004 | Sandell et al. | 370/210 |
| 2004/0141548 | A1* | 7/2004 | Shattil | 375/146 |
| 2004/0184398 | A1* | 9/2004 | Walton et al. | 370/203 |
| 2004/0264362 | A1* | 12/2004 | Rhodes | 370/208 |
| 2005/0073946 | A1* | 4/2005 | Dey et al. | 370/208 |

(Continued)

OTHER PUBLICATIONS

Chu, "Polyphase Codes With Good Periodic Correlation Properties," IEEE Transactions on Information Theory, 18:531-532, Jul. 1972.

(Continued)

*Primary Examiner*—Aung S. Moe
*Assistant Examiner*—Awet Haile
(74) *Attorney, Agent, or Firm*—Pablo Meles; Akerman Senterfitt

(57) ABSTRACT

A preamble for an OFDM signal synchronizes (104) and estimates (106) the sub-channels with only one code. One polyphase code sequence is used repeatedly for the preamble. The preamble is spread out over the bandwidth, which is the same as an OFDM symbol in the frequency domain and has good autocorrelation characteristics in the time domain. All OFDM signals are added with this preamble at the beginning of the OFDM signal and transmitted on the channel at a transmitter (50). At the receiving end, the receiver (100) first does the autocorrelation process to find out a peak value for synchronization in the time domain. Then, since the polyphase code is known at the receiver, the signal to noise ratio for each sub-carrier is calculated in the frequency domain and smoothed using the normal (Gaussian) distribution to provide the channel estimation. Since the synchronization and channel estimation are processed with a single preamble, the overhead for these two functions is significantly reduced.

8 Claims, 14 Drawing Sheets

U.S. PATENT DOCUMENTS

2005/0111590 A1*  5/2005  Fang et al. .................. 375/330
2005/0259568 A1* 11/2005  Yeh et al. .................... 370/208
2008/0002568 A1*  1/2008  Wu et al. ..................... 370/208

OTHER PUBLICATIONS

Schroeder, M. "Synthesis of Low-Peak-Factor Signals and Binary Sequences with Low Autocorrelation," IEEE Transactions on Information Theory, 85-89, Jan. 1970.

Bingham, J., "Multicarrier Modulation for Data Transmission: An Idea Whose Time Has Come," IEEE Communications Magazine, 28:5-14, May 1990.

Baig et al., "A Discrete Multitone Transceiver at the Heart of the PHY Layer of an In-Home Power Line Communication Local-Area Network," IEEE Communications Magazine, 41:48-53, Apr. 2003.

Caire et al., "Bit-Interleaved Coded Modulation," IEEE transactions on Information Theory, 44:927-946, May 1998.

* cited by examiner

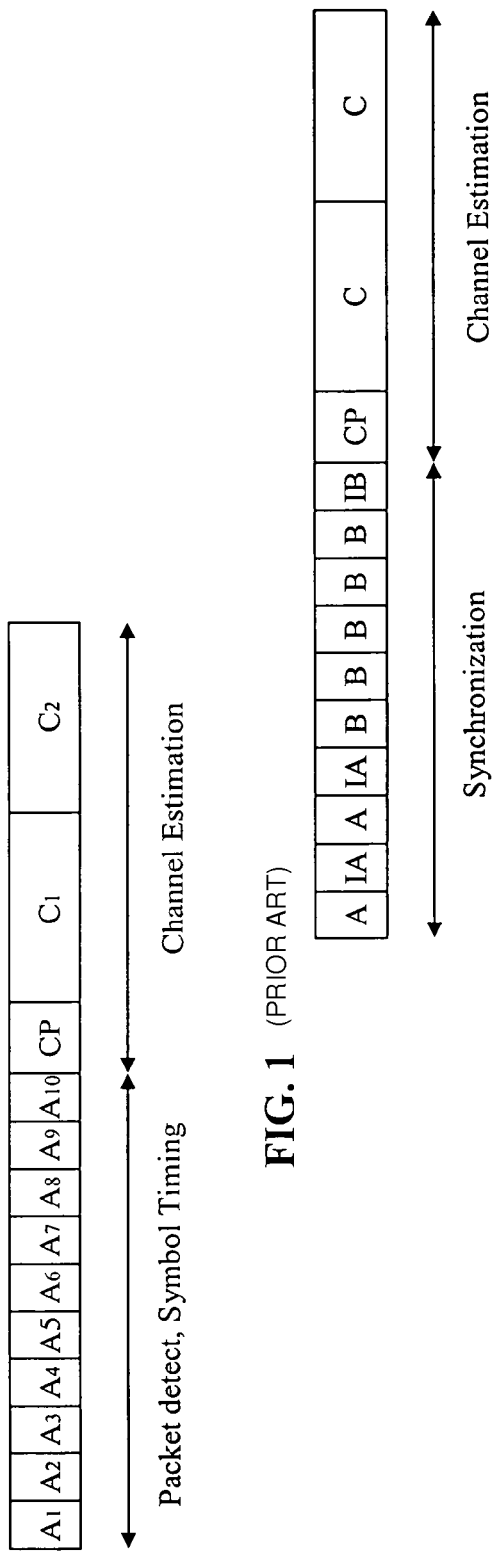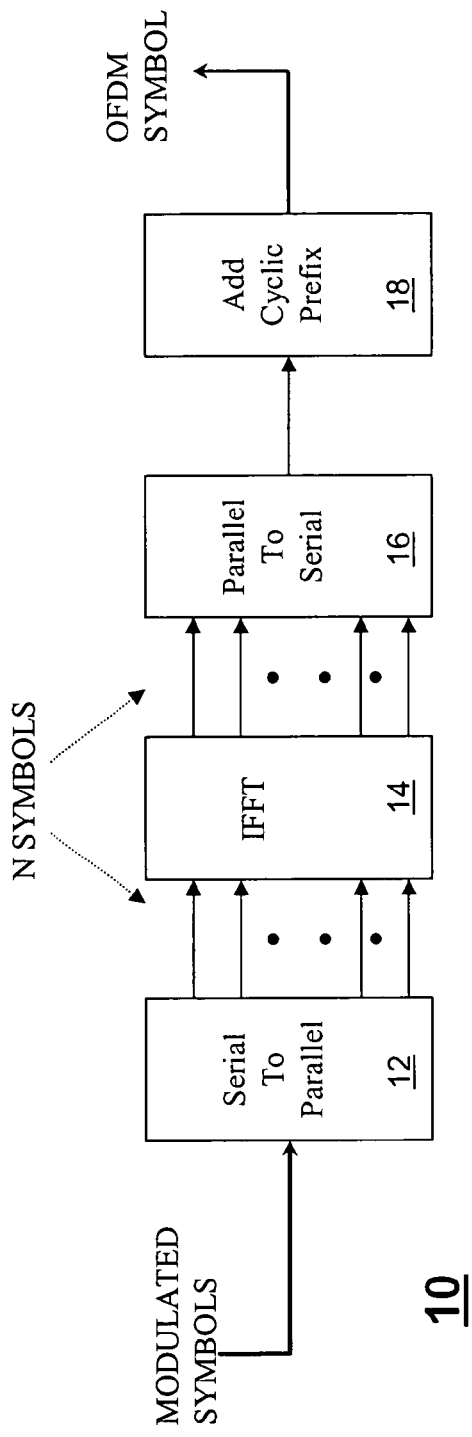

CHANNEL ESTIMATION AND SYNCHRONIZATION WITH PREAMBLE USING POLYPHASE CODE

FIELD OF THE INVENTION

The present invention relates to broadband communication systems for wireless and wired channels, and more particularly to efficient synchronization and channel estimation in such systems.

BACKGROUND OF THE INVENTION

Orthogonal Frequency Division Multiplexing (OFDM) is a promising candidate for achieving high data rate transmissions in many communication areas. In OFDM, the available bandwidth is divided into a number of channels so that each channel has a small portion of the total bandwidth and is called a sub-carrier. Orthogonality amongst sub-carriers is achieved by using an Inverse Fast Fourier-Transform (IFFT) process. In addition, sub-carriers are overlapped in a frequency domain, which leads to a spectral efficiency. Each sub-carrier delivers one modulated symbol and all sub-carriers are transmitted at the same time so that high data rate is achieved.

In general, a communication channel may be characterized by frequency selective fading. Under this environment, each sub-carrier experiences different channel distortions. In order to achieve reliable communication, the current characteristics of all sub-carriers should be collected at the receiver and are fed back to the transmitter.

In addition, the type of communication for data transmission is a packet-based and the receiver should know when the packet is started.

Techniques to handle frequency selection fading and to determine the start of a packet are called channel estimation and synchronization, respectively, which are conducted using a preamble known to both sides of transmitter and receiver and added at the beginning of the packet.

The preamble for the OFDM used in the IEEE 802.11 standard is shown in FIG. 1. The parts from A1 to A10 are short training symbols that are all identical, and are to detect the boundary of the packet. CP is a cyclic prefix to protect C1 and C2 from inter-symbol interference. C1 and C2 are OFDM symbols used to estimate all sub-carriers.

The preamble used in the HyperLAN/2 standard is shown in FIG. 2. HyperLAN/2 has been designed with several different preambles that are used for different packet types. A and B represent different waveform and I means the inverted signal of A or B. CP is the cyclic prefix and C is the OFDM symbol.

In these two standards, even though the OFDM symbols modulated with bit sequence such as C1, C2 and C are used for channel estimation, they still have the drawbacks of commonly used OFDM symbols, that is, the high peak to average ratio (PAR), which degrades the system performance significantly. In addition, all preambles are divided into two parts, packet detection/symbol timing and channel estimation, leading to significant overheads.

BRIEF SUMMARY OF THE INVENTION

In accordance with an embodiment of the present invention, one waveform as a preamble is designed to carry out both synchronization and channel estimation in a multicarrier communication system, thus the preamble structure is simpler and the overhead in a packet is significantly reduced.

The waveform of the preamble can have the same bandwidth as the OFDM symbol for channel estimation and can have a good autocorrelation characteristic for synchronization.

A polyphase code composed of phase-shifted complex numbers and having good auto correlation in the time domain can be used. The length of this code is same as the number of sample points of an IFFT used to generate an OFDM symbol. When this code is inversely Fourier-transformed, the bandwidth of this code is the same as the one of the OFDM. In addition, since the inversely Fourier-transformed polyphase code block has a constant envelop after the IFFT, a high PAR problem is solved. A preamble in accordance with the present invention comprises of several same inversely Fourier-transformed polyphase code blocks attached to the beginning of the OFDM symbol.

When a packet is received at the receiver, the preamble of that packet is processed with a correlator in order to find a peak point, which means the starting point of that packet and then, the preamble is Fourier-transformed. Since the output of FFT reflects the condition of each sub-carrier, the SNR and the channel gain of each sub-carrier are calculated. In addition, the phase information of the polyphase code in a preamble is used as a reference phase for the differential modulation in a non-coherent communication system.

In order to increase spectral efficiency and achieve reliable transmission, the receiver estimates the signal-to-noise ratio (SNR) of each sub-carrier when the frame with the same structure as the preamble is transmitted at the communication setup phase and a different number of bits are allocated on each sub-carrier based on the SNR estimates. However, the drawback in the art of OFDM is caused by an impulse noise leading to bursts of errors, which is particularly true in the powerline communication system. In order to compensate for this, Bit-Interleaved Coded Modulation (BICM) can be used to achieve a more reliable transmission under impulse noise.

Additional features will be presented with the following description and claims.

DETAILED DESCRIPTION OF THE DRAWINGS

FIG. 1 is a preamble structure of IEEE802.11 standard;

FIG. 2 is a preamble structure of HYPERLAN/2 standard;

FIG. 3a is a block diagram of an example of the signal processing of an OFDM transmitter;

FIG. 9b is the autocorrelation of FIG. 9a;

DETAILED DESCRIPTION OF THE INVENTION

OFDM takes a high-speed serial data stream to be transmitted, processes it as multiple parallel bit streams, and transmits it at the same time so that it achieves a high data rate. OFDM provides a high data rate by using a multicarrier system to transmit data instead of using a single carrier.

Figure 3B:
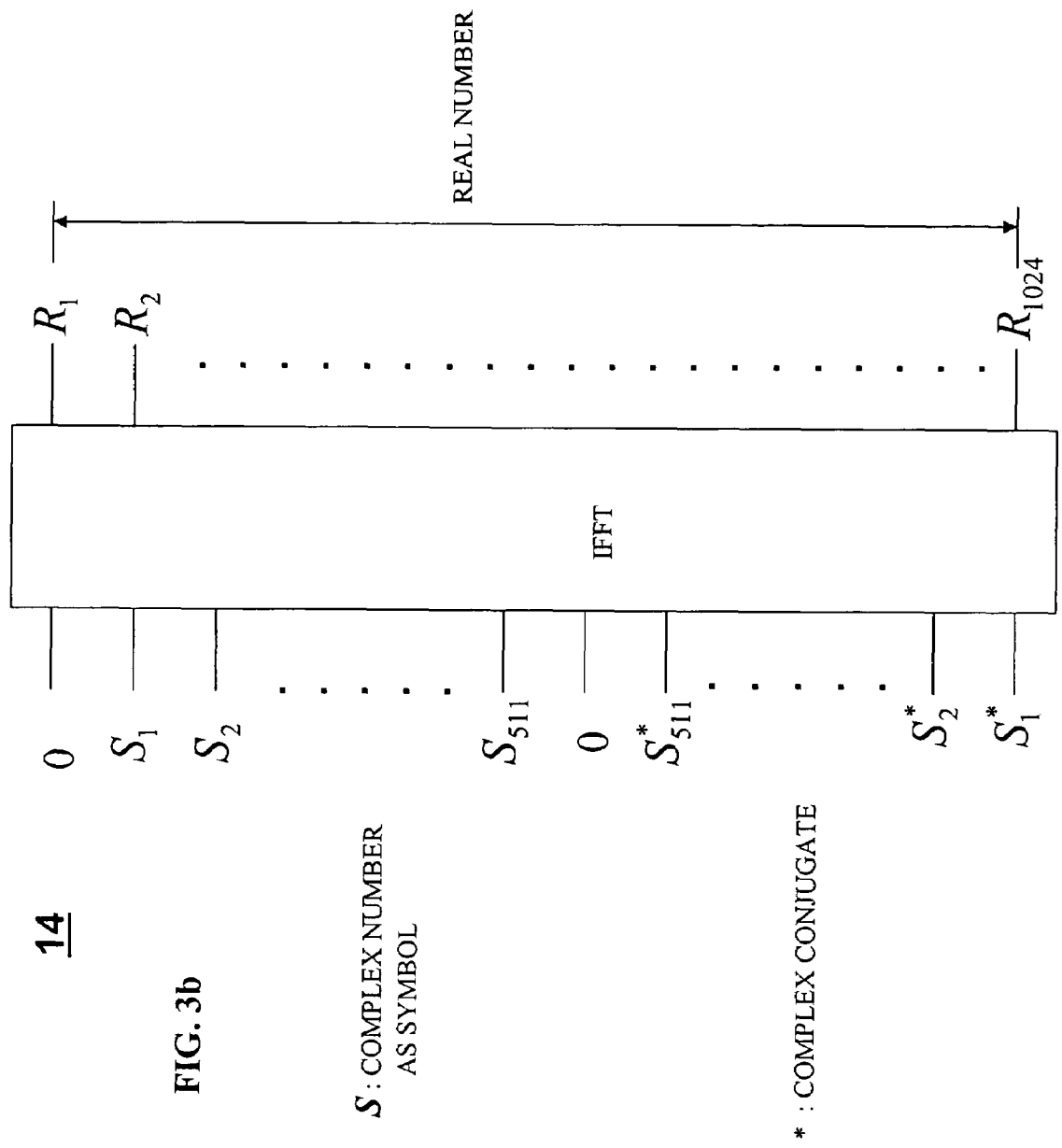
FIG. 3b illustrates an arrangement of input symbols for an IFFT process.
Figure 4:
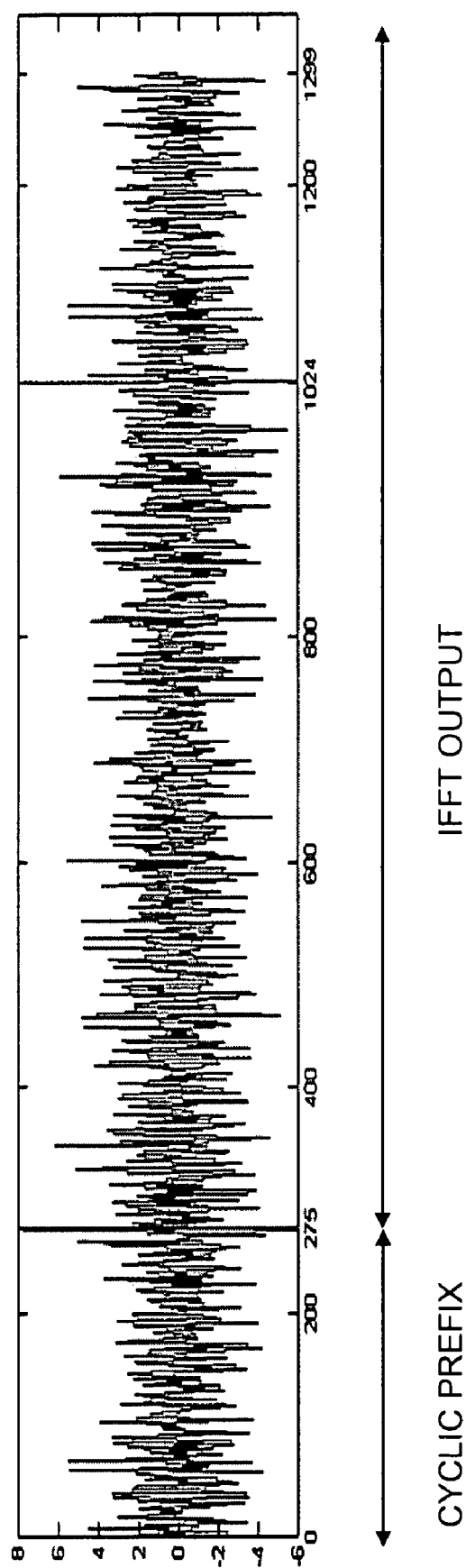
FIG. 4 is a signal of OFDM symbol in time domain using differential modulation in accordance with the present invention.

The structure of OFDM System is shown in FIG. 3a. After data bits are modulated to symbols that are complex numbers, a number of symbols, say N, is parallelized at block 12 and is inversely Fourier-transformed using IFFT block 14, which is the main component of OFDM. The number of input (N) is equal to the number of sub-carriers in the frequency domain and each symbol is modulated with each sub-carrier. However, two times N inputs come into the IFFT block 14 in order to make the output be real number that has Hermitian symmetry, but the number of input data symbols is still N. This process is shown in FIG. 3b. The output of IFFT is a time domain signal and has the information of N data symbols. N parallel symbols are converted to a serial signal at block 16. In the final step, some part of the output is copied, which is called a cyclic prefix 18 that prevents the original signal from Inter Symbol Interference (ISI) and attached to the beginning of the output. The final output waveform is called an OFDM symbol, which has the duration of time, 2T, and is transmitted through the channel. FIG. 4 shows one OFDM symbol when differential modulation is used.

Figure 5:
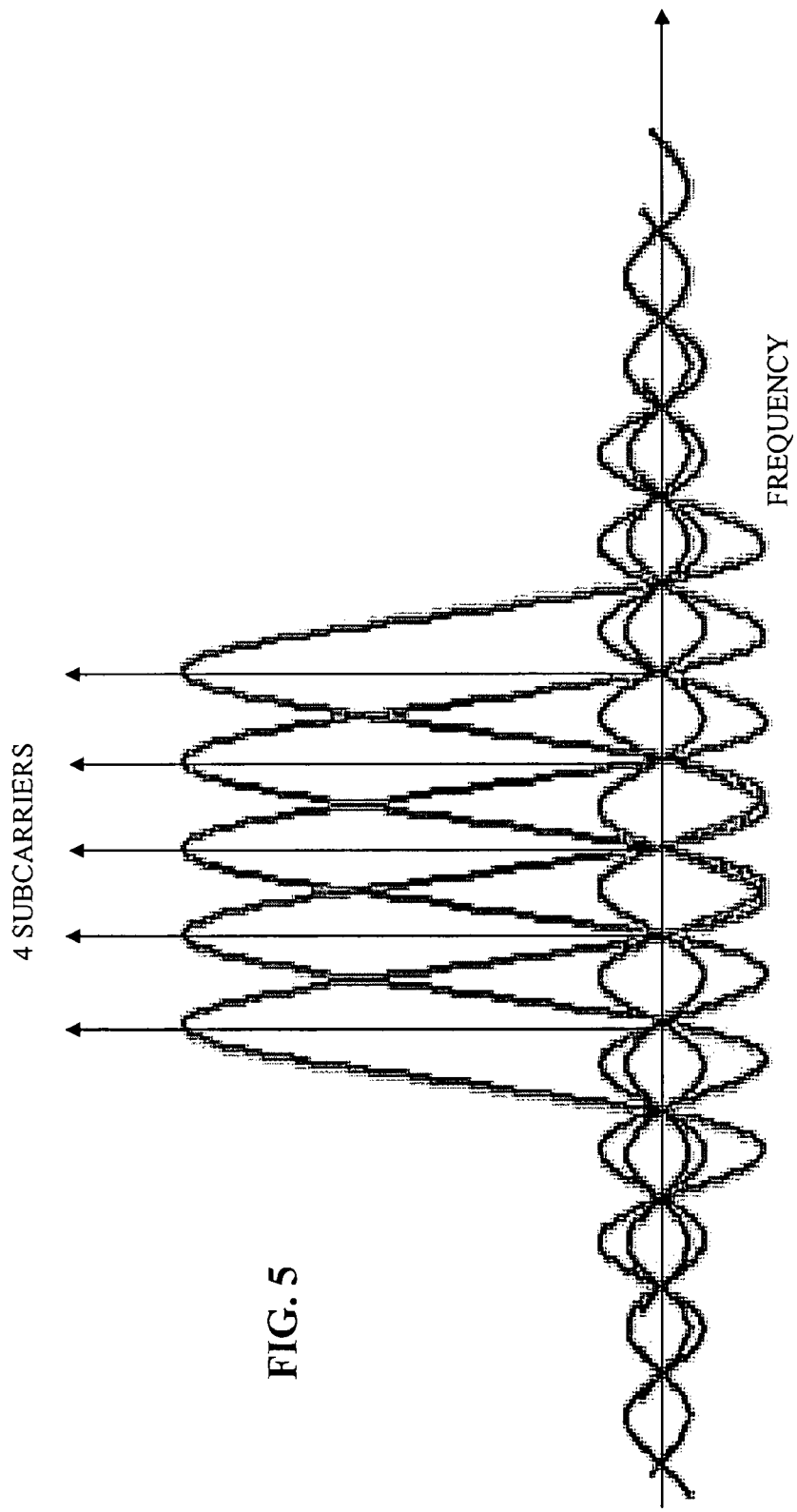
FIG. 5 shows a frequency distribution of OFDM sub-carriers and illustrates that OFDM sub-carriers are orthogonal and overlapped in accordance with the present invention.

FIG. 5 shows the spectral of individual sub-carriers in frequency domain in OFDM. In order to guarantee the orthogonality, the spectral peak of each carrier must coincide with zero crossing of all the other carriers as depicted in FIG. 5. The minimum required spacing, which is the difference between the center lobe and the first zero crossing, is equal to 1/T. With characteristics such as the orthogonality and the overlapping, OFDM is a promising candidate for achieving high data rate transmission in many communication areas.

A communication channel may experience frequency selective fading, which means that each sub-carrier in an OFDM signal has different channel conditions with different channel gain and signal-to-noise ratio (SNR) when it is transmitted through the channel even though all sub-carriers are transmitted at the same time. Therefore, the receiver using a multicarrier system like OFDM needs to know the channel gain of each sub-carrier for the demodulation process. In addition, both the receiver and transmitter need to know the signal-to-noise ratio (SNR) for each sub-carrier in order to achieve more reliable and effective communication with a bit allocation scheme over each sub-carrier.

The communication system using OFDM mainly deals with data transmitted and received in a packet form. When a receiver receives OFDM packet, it first tries to detect the beginning of the symbol which is called synchronization. In general, the synchronization process is a correlation process using a code having good autocorrelation known at both the receiver and transmitter.

Figure 6:
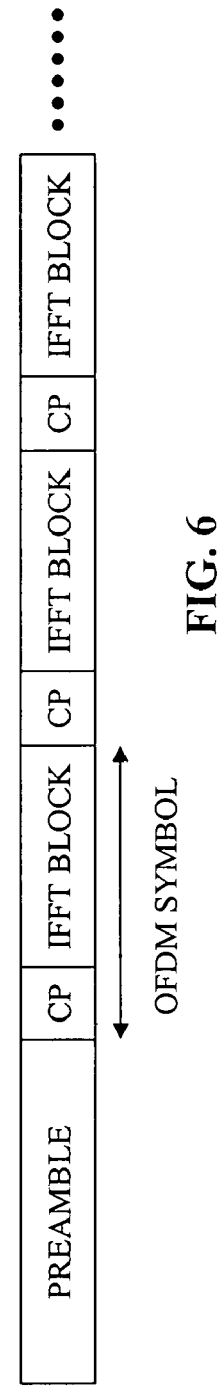
FIG. 6 shows a example of a structure of a communication packet in OFDM in accordance with the present invention.

Most transmitted waveforms through a communication channel have a part at the beginning to be used for channel estimation and synchronization, which is called a preamble that does not have any information bit. Referring to FIG. 6, a preamble is followed by OFDM symbols. The total waveform with a preamble and OFDM symbol is called a packet.

Referring to FIGS. 1 and 2, preambles consist of several code blocks, each of which has a different function. In general, a preamble may be divided into two parts, channel estimation and synchronization. Since a preamble has two parts, this increases the overhead of a waveform. In accordance with an embodiment of the invention, the overhead can be reduced by appropriately choosing a code having good correlation with the same bandwidth as an OFDM symbol for a preamble.

Preamble Design

Figure 7:
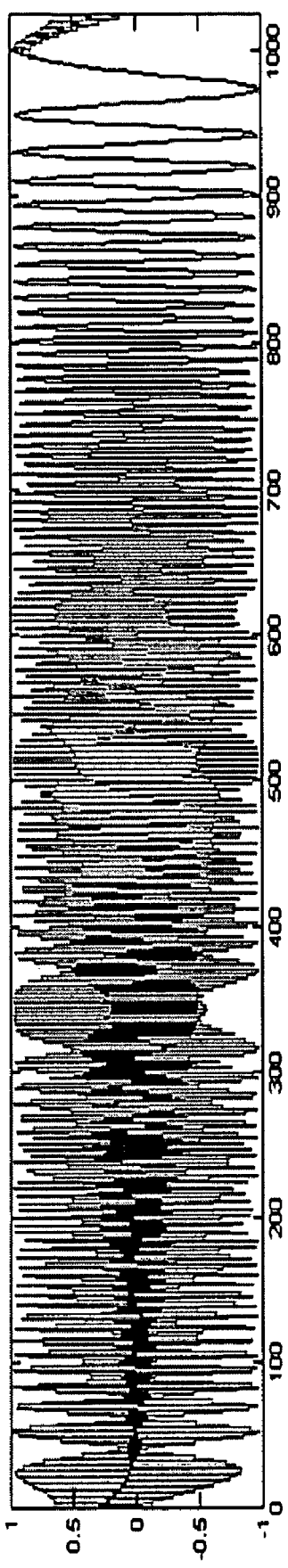
FIG. 7 shows a signal with 1024 samples after polyphase code sequence where 512 samples are processed through IFFT in accordance with the present invention.

A polyphase code can be generated by following equation:

$$a_k = \exp i\frac{\pi k^2}{N}, N \text{ is even}$$

$$a_k = \exp i\frac{\pi(k+1)}{N}, N \text{ is odd}$$

where k is the sub-carrier number from 0 to N-1, and N is the number of sub-carrier. N is chosen depending on the IFFT size, for instance, if IFFT size is 1024, N is the half of 1024, that is 512. In addition, N is even since IFFT size is usually even. Each complex number, $a_k$, is assigned to each sub-carrier and the signal magnitude over all sub-carriers is the same. N complex numbers (from $a_0$, to $a_{N-1}$) generated is rearranged for Hermitian symmetry explained in FIG. 3b. The waveform after 1024 IFFT is in FIG. 7. Referring to FIG. 7, the envelope of polyphase code in time domain is almost constant while in general an OFDM symbol has high peak-to-average ratio. This characteristic is good for an OFDM system since high peak-to-average ratio causes the degradation of system performance.

Figure 8A:
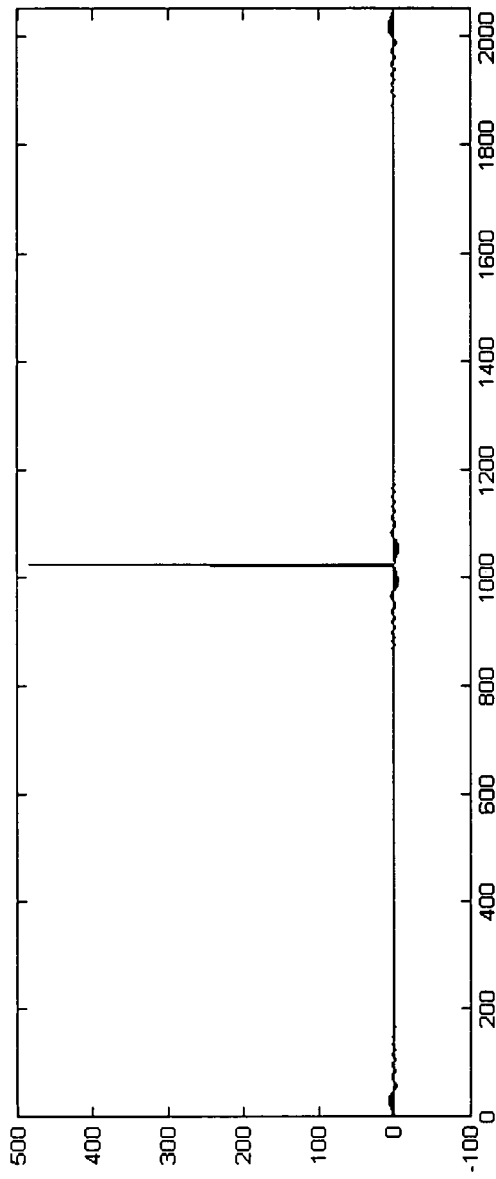
FIG. 8a is the autocorrelation of the signal after IFFT process of polyphase code sequence with 512 in accordance with the present invention.

In FIG. 8a, the autocorrelation of polyphase code with 512 code length is shown. The peak point is at the $1024^{th}$ point, which means the last point of one polyphase code. Almost all zeros are at the other sample points, which is good autocorrelation characteristic.

Figure 9A:
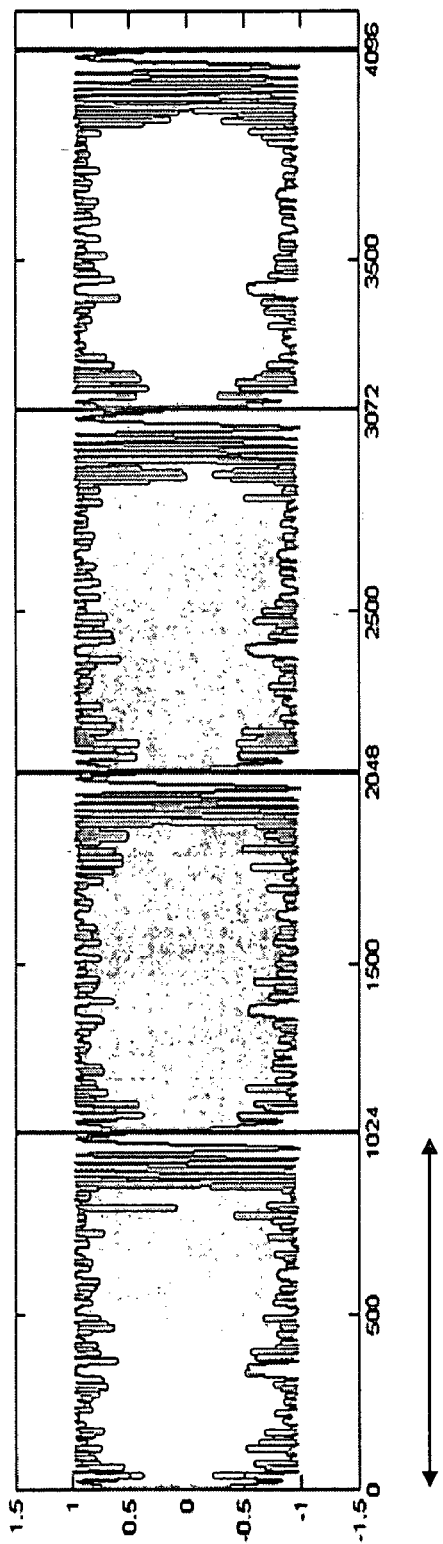
FIG. 9a shows a signal of a preamble that has four same polyphase code sequences in accordance with the present invention.
Figure 9B:
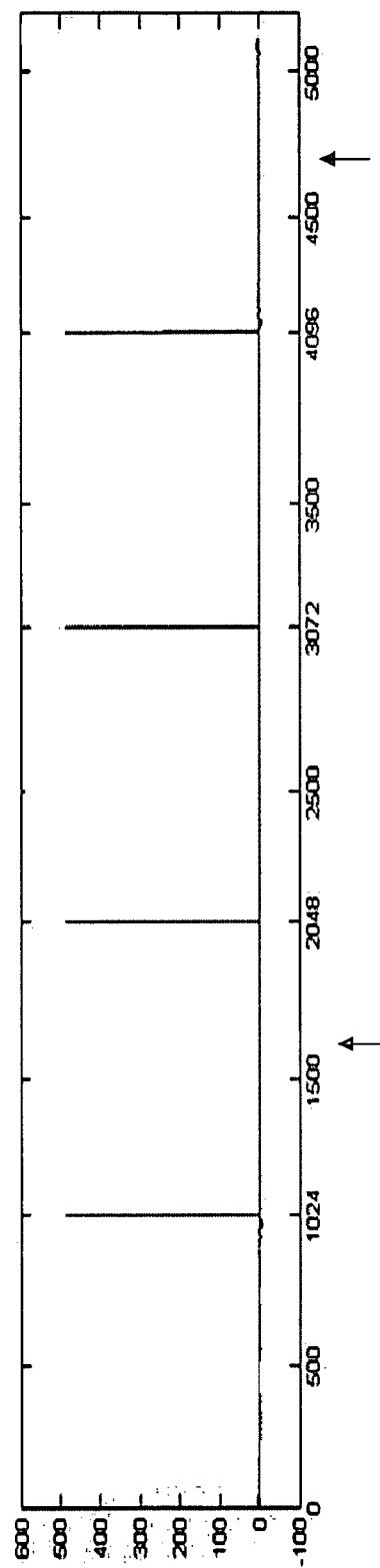

More than two inversely Fourier-transformed signal blocks having the same polyphase code block for a preamble in OFDM system can be used. The reason for using several signal blocks as a preamble is for better synchronization. The number of signal blocks is variable according to the channel. In the case of a power line as a communication channel, 4 signal blocks can be used. An Inverse-Fourier-transformed signal of a polyphase code sequence as mentioned above can be replicated 4 times and 4 replicated signals are placed in serial. The waveform in accordance with the invention in time domain is shown in FIG. 9a using 1024 IFFT and the autocorrelation of this waveform is shown in FIG. 9b. Four peaks in autocorrelation means there are four code blocks. Referring to FIG. 9a, the envelope of signal is constant so that the peak to average ratio is not a problem in the invention.

Synchronization and Channel Estimation

When the packet arrives at the receiver, the convolution process is done with the received sample points and tries to find the peak. Even though the receiver detects the first peak, it can not be said the peak point is the end of one code block since the transmitted waveform may be distorted by noise. In order to confirm this peak, the receiver checks if there is the other peak after N sample points. If there is, the sample point of the other peak is considered as the end of one code block. If no, the sample point of this peak is considered to be the end of one code block. The convolution process is done until four peaks are detected. However, the 4 peaks can have different magnitudes due to the noise. Therefore, the threshold for deciding the peak is Threshold=$\kappa \times P$ where $\kappa$ is a constant between 0.7 and 1.0, and P is a magnitude of the first peak. If the number of peaks is less than the number of code sequence blocks, the synchronization is considered as a fail.

The system knows the OFDM symbol begins after the sample point of the last peak. This is a synchronization process.

After all peaks are detected, the previous received 1024 samples from the sample point of the first peak are Fourier-transformed. This same process is done for the other three peaks. Even though the transmitter transmitted the preamble having a constant power spectra density in the frequency domain, one of the received signals can be changed due to the fading and noise. This is a channel characteristic. Now, the receiver has five channels of information and a channel gain for each sub-carrier is calculated with this information since the receiver knows the signal transmitted on the each sub-carrier.

Figure 10:
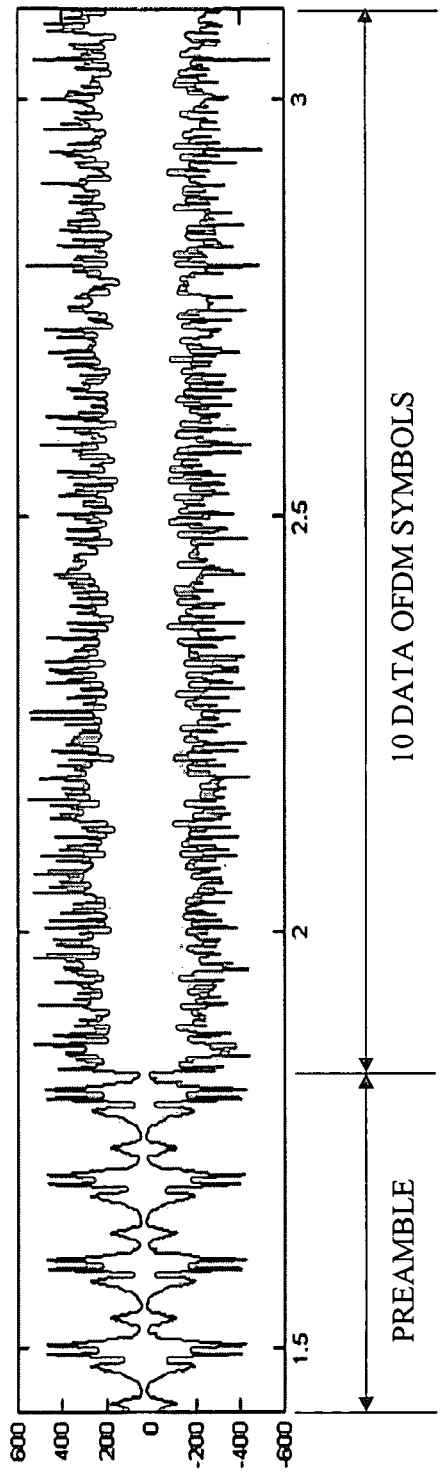
FIG. 10 is a preamble and 10 data OFDM symbols including noise and fading after passing through a power line as a communication channel in accordance with the present invention.
Figure 11:
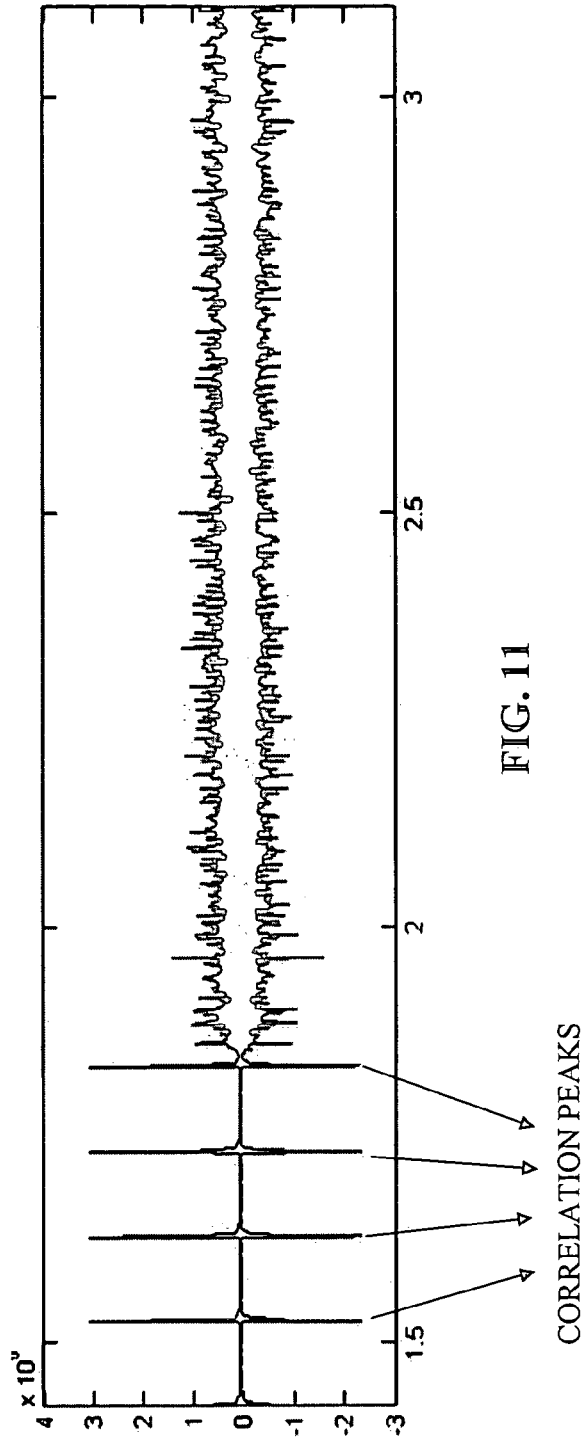
FIG. 11 is the results after a correlation of the signal in FIG. 10 in accordance with the present invention.
Figure 12:
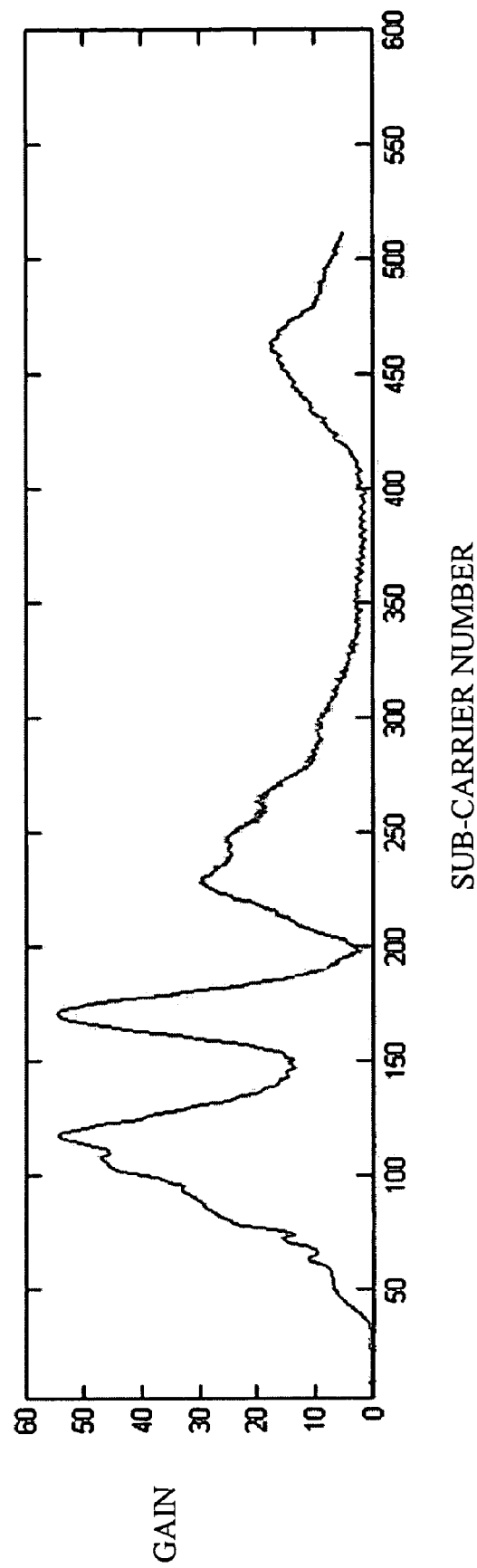
FIG. 12 is a channel gain over 512 sub-carriers of the signal in FIG. 10 in accordance with the present invention.

Using a powerline as a communication channel, FIG. 10 shows a received waveform in the time domain. FIG. 9a is changed to FIG. 10 by noise and fading. The result of the convolution of a signal in FIG. 10 is shown in FIG. 11. There are four peaks and the distance between two peaks is 1024 sample points. The estimated channel gain over 512 sub-carriers is shown in FIG. 12. FIG. 12 shows the fluctuation of the gain which illustrates the frequency selective fading of powerline.

While the estimation of channel gain and synchronization is indispensable functionalities for communication system, the SNR calculation is also necessary for the reliable and frequency efficient communication for the OFDM. SNR estimation at the state of communication setup is used herein so that bit loading is applicable.

Even though bit loading is good for frequency selective fading, there is impulse noise which is not solved by bit loading. With impulse noise, the channel condition is changed suddenly so that all symbols transmitted at the same time are distorted and causes a burst error. In order to overcome this problem, Bit Interleaving Code Modulation (BICM), a combination of modulation and error correction coding, is used.

Bit Loading

Figure 13:
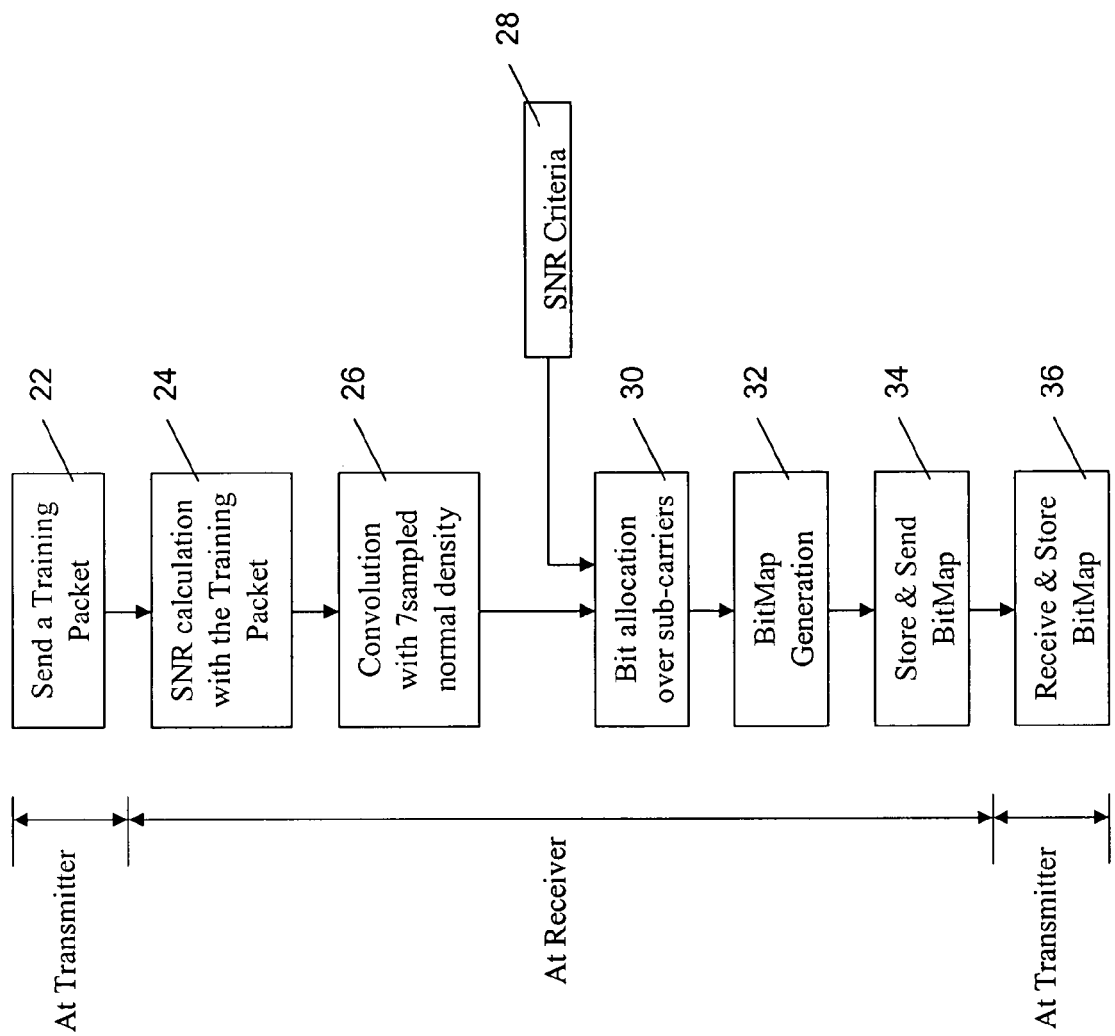
FIG. 13 is a block chart of SNR estimation and bit loading at the receiver in accordance with the present invention.
Figure 14B:
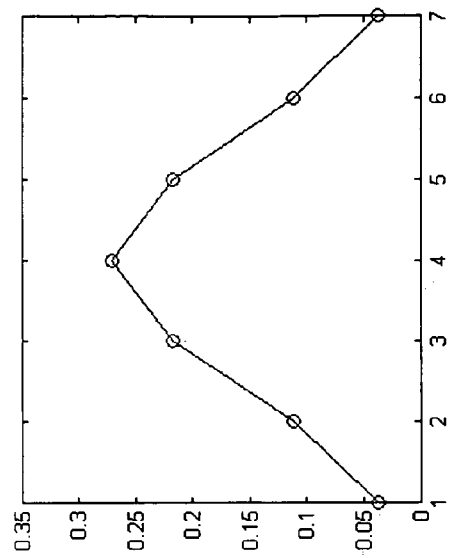
FIG. 14b is a 7 sample point from normal density which is convolved with FIG. 14a in accordance with the present invention.
Figure 14A:
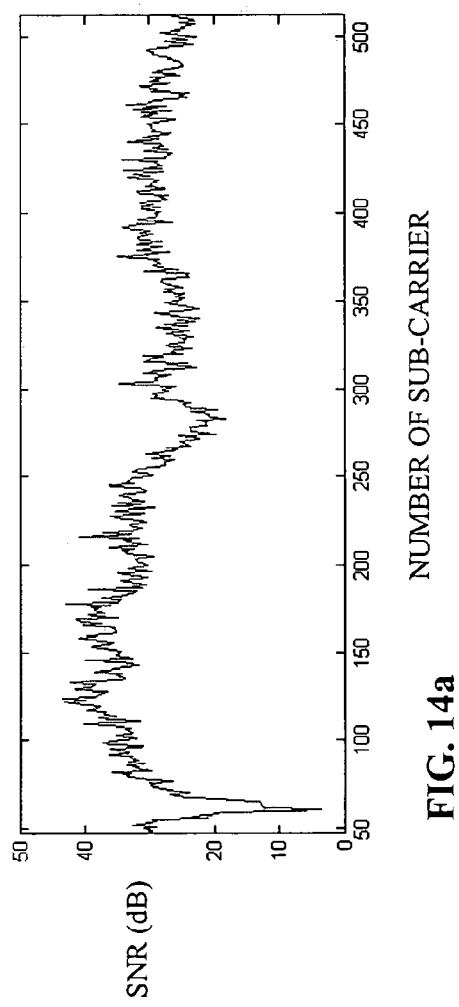
FIG. 14a is a SNR distribution over 512 sub-carriers in a power line channel using a preamble with 6 sequences in accordance with the present invention.

A transmitter can send a packet having the preamble with the only 6 poly phase code sequence of the same kind, instead of 4, in the OFDM packet. This is called a training packet. FIG. 13 shows the process chart or method 20 for the SNR calculation and bit allocation for all sub-carriers at the receiver. A training packet can be sent at step 22 and then SNR can be calculated at step 24 using the training packet. FIG. 14a shows the SNR distribution over sub-carriers. However, referring to FIG. 14a, the envelope of SNRs has rapid fluctuation and spiky. This rapid fluctuation does affect the decision of bit loading since an improper number of bits can be assigned on each sub-carrier. The reason is that since the noise energy of each sub-carrier is obtained from calculating the variance of the received signal of each sub-carrier, the signal energy is obtained through subtracting the noise energy from the received signal energy, hence 6 poly phase code sequences for the calculation of the variance of signal is not enough. The more accurate way to measure the SNR is to send a large number, like 100, of identical training symbols. However, it causes many overhead. For compensating this, some technique is used to make the SNR curve smoother, which should be closer to the curve of real SNR.

Figure 14C:
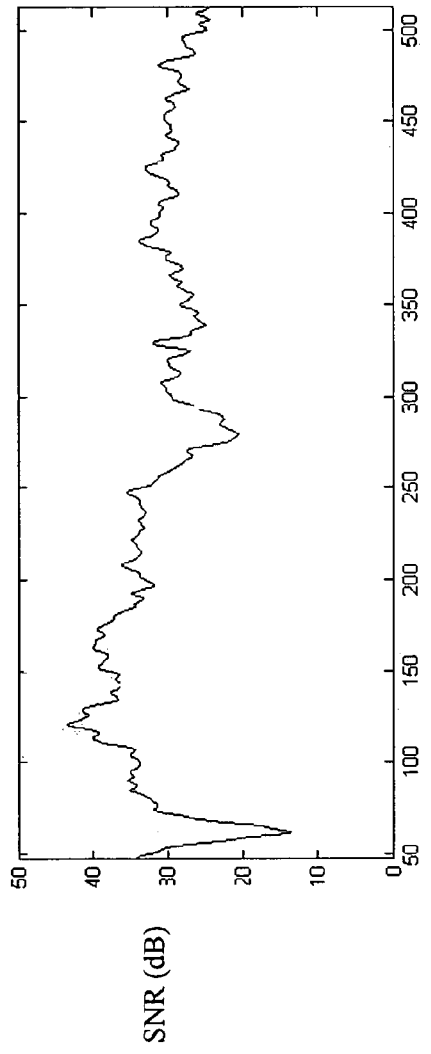
FIG. 14c is a smoothed SNR distribution over 512 sub-carriers of power line channel in accordance with the present invention.

Based on observations, it can be assumed that this fluctuation is caused by the background noise like AWGN. The most efficient way to do the channel smoothing in this situation is to convolve at step 26 the SNR of 6 sequences with the 7 sample points of normal density (Gaussian) function so that the effect of noise in SNR can be removed. FIG. 14b shows 7 sample points of normal density and FIG. 14c is the convolution results with FIG. 14a and 14b.

According to the smoothed SNR distribution, the receiver decides how many bits are allocated to each sub-carrier at step 30. The criterion 28 for the bit allocation is shown in Table 1 below using Multi-Layer Differential Phase Shift Keying (MLDPSK).

TABLE 1

| Modulation Type | Allocated Bits | SNR range |
| --- | --- | --- |
| DBPSK | 1 | $11 \leq SNR < 18$ |
| DQPSK | 2 | $18 \leq SNR < 22$ |
| 8-ary MLDPSK | 3 | $22 \leq SNR < 26$ |
| 16-ary MLDPSK | 4 | $26 \leq SNR < 30$ |
| 32-ary MLDPSK | 5 | $30 \leq SNR < 34$ |
| 64-ary MLDPSK | 6 | $34 \leq SNR$ |

The bit allocation information for all sub-carriers is forms a BitMap at step 32 which has the bit allocation list over sub-carriers. The BitMap is then stored at the receiver and sent back to the transmitter at step 34 using DBPSK modulation. The bitmap is also received and stored at the receiver at step 36 for the demodulation.

Data Transmitting

Figure 15:
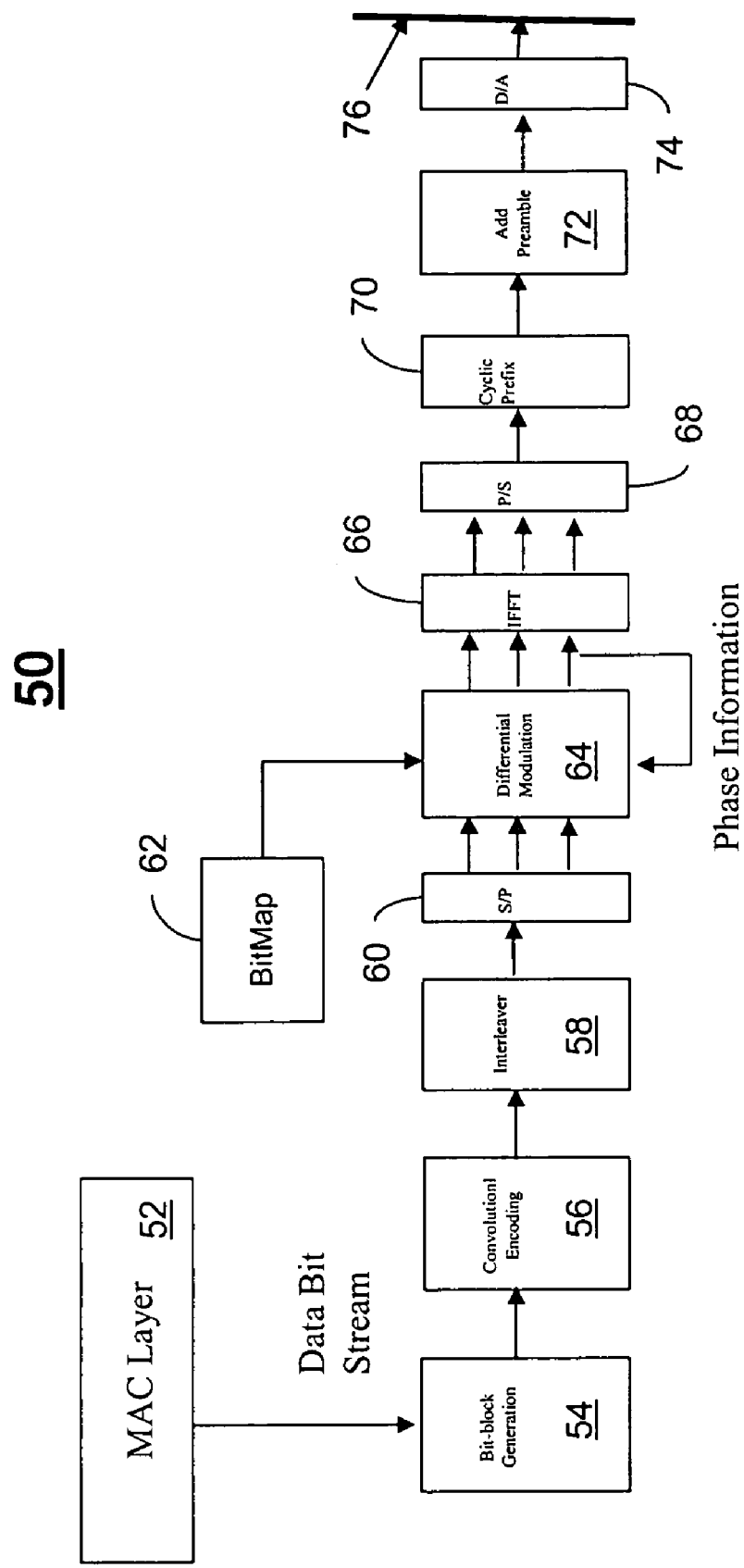
FIG. 15 is a detailed block diagram of a physical layer (PHY) at the transmitter for the power line communication in accordance with the present invention.
Figure 17:
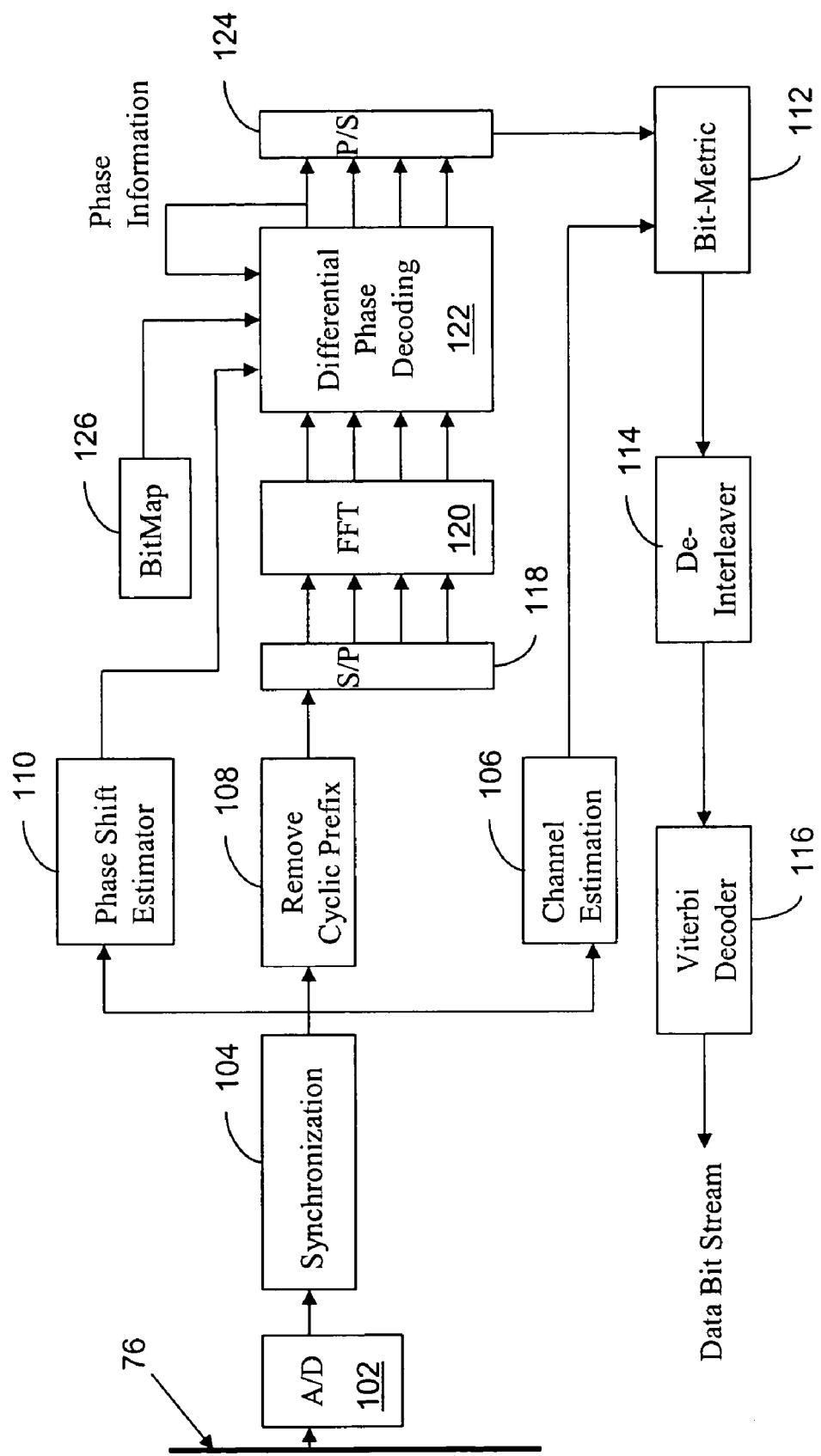
FIG. 17 is a detailed block diagram of a physical layer (PHY) at the receiver in accordance with the present invention.

FIG. 15 shows a block diagram of a transmitting system 50 and FIG. 17 shows a block diagram of a receiving system 100. After the transmitter 50 receives a BitMap 62, the process for the data transmission is started when the data bit stream comes down from a Medium Access Control (MAC) layer 52.

The art of BICM consists of a convolutional encoder 56, Viterbi decoder 116, bit-interleaver/de-interleaver (58/114)

and modulation/demodulation (64/122) which MLDPSK is used. The key point of BICM is on the demodulation process to be described later.

Figure 16A:
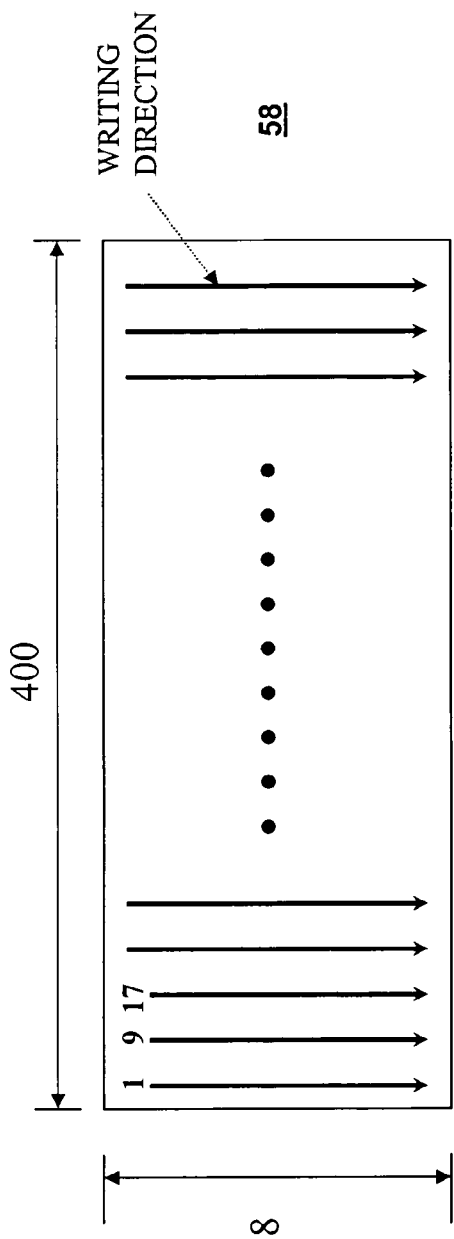
FIG. 16a illustrates the writing process in interleaver in FIG. 15.
Figure 16B:
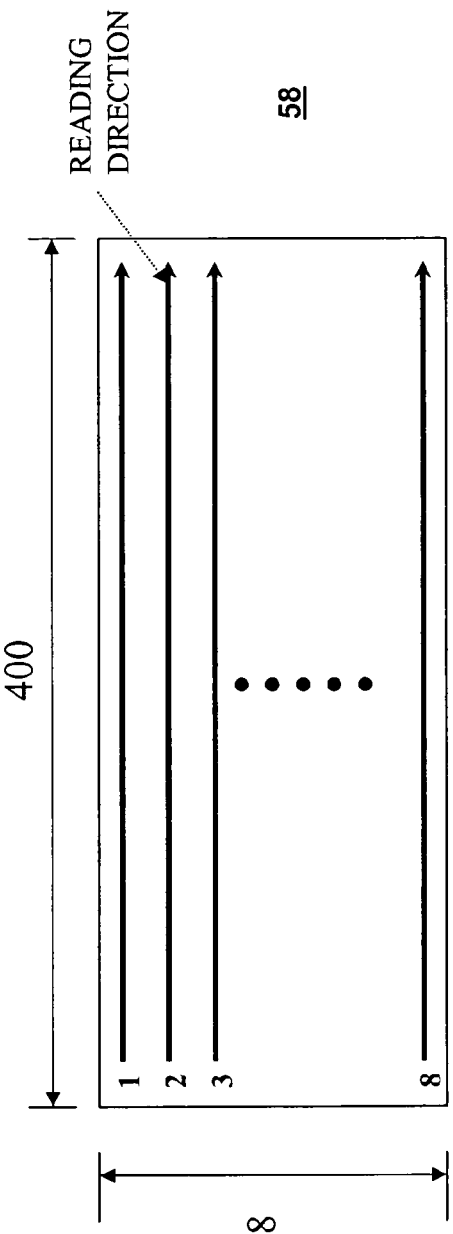
FIG. 16b illustrates the reading process in interleaver in FIG. 15.

The data bit stream from the MAC layer is divided into blocks (using bit block generator 54) for OFDM symbol and the block size is determined based on the number of sub-carriers and the BitMap 62. The size of a bit-block is $$\left(\frac{N_{bitmap}}{N_{output}} - N_{reg} + 1\right) \times N_{input}$$

where $N_{bitmap}$ is the total number of bits in BitMap, $N_{output}$ and $N_{input}$ are the number of output and input of the encoder, respectively, and $N_{reg}$ is the number of registers in encoder. This one bit-block composes one OFDM symbol. This block is encoded by the convolutional encoder 56, and then is interleaved using interleaver 58. FIG. 16a to 16b show the block interleaver 58 with 400 columns and 8 rows which is a sufficient for using 1024 IFFT size and 64 constellation size. Since the total number of bits in the interleaver 58 is varied with bit-loading, the memory size for the interleaver 58 should be bigger than 1024×6. FIG. 16a illustrates the writing process and FIG. 16b illustrates the reading process. The bit stream read from the block interleaver 58 is divided to a number of bit blocks according to the BitMap to form symbols, for instance, one group has 4 bits for 16-ary MLDPSK. Each bit block is mapped to one of the points on the constellation of the modulation specified by the BitMap. Here, one symbol block has $N_{IFFT}$ number of points. Before differential phase encoding or modulation, the serial symbols from the interleaver 58 are converted to parallel values using a converter 60. The differential phase encoding (64) is not done with two consecutive points in a same symbol block. Using OFDM, this process is done with one point in current symbol block and one already encoded symbol in the previous symbol block and both should be for the same sub-carrier. With one exception, the symbols in the first symbol-block are differentially encoded with symbols consisting of a preamble.

The number of symbols in a symbol-block is the same as a half of IFFT size, $N_{IFFT}$. A symbol-block is paralleled and is inverse Fourier-transformed using IFFT at block 66, which is a main component of OFDM. The number of input ($N_{IFFT}$) is the number of sub-carriers in the frequency domain and each symbol is assigned to each sub-carrier. However, two times $N_{IFFT}$ inputs come into IFFT in order to make the output be a real number that is called Hermitian symmetric operation, but the number of input data symbol remains $N_{IFFT}$. This process is explained using 1024 IFFT in FIG. 3b. The output of IFFT is a time domain signal and has the information of $N_{IFFT}$ data symbols (which can be serialized in parallel using converter 68). In the final step, some of the tail part of the output is copied using the cyclic prefix block 70 to prevent the original signal from Inter Symbol Interference (ISI) and attached to the beginning of the output to form a preamble at block 72. The final output waveform is called an OFDM symbol and is transmitted through the channel 76. The OFDM symbol size can be $$2 \times N_{IFFT} + N_{CP}$$

where $N_{CP}$ is the size of the cyclic prefix. At the final step, the preamble is attached in the beginning of the OFDM symbol in order to synchronize and estimate the channel. This is called a data frame. This frame is converted to an analog signal through digital-to-analog converter 74 and then transmitted through the channel 76.

Receiver

FIG. 17 shows the block diagram of the receiver system 100 including an analog to digital converter 102 and a synchronization block 104.

When the data frame with preamble and OFDM symbols are received, at first, the receiver 100 first finds out the starting point of the packet using the methods described above. Secondly, the channel gains for all sub-carriers are estimated using a preamble in the channel estimation block 106.

There is one more thing to do with a preamble, which is the correction of phase shift. The sampling clock rate difference between the transmitter and receiver is very common in the real systems and causes the phase shifts in each sub-carrier. The preamble is used to estimate the phase shifts using a phase shift estimator 110. The phase shift between two consecutive code sequence blocks of preamble in the ith sub-carrier after FFT is:

$$P_i = P_{i,j} - P_{i,j+1}$$

where $P_{i,j}$ is the signal phase of the ith sub-carrier in the jth code sequence blocks. At first we obtain the average phase shift $\overline{P_i}$ of each sub-carrier, and we know that the ratio between the phase shift $\overline{P_i}$ and the sub-carrier index i should be a constant. Using the least square method, we can get the ratio from the average phase shift of each sub-carrier as follow:

$$\alpha = \frac{\sum \overline{P_i} * i}{\sum i^2}$$

and the phase compensation for ith sub-carrier is made with $\alpha*i$.

After the three things (synchronization, channel estimation, and phase estimation) with the preamble are done, the sampled signals are processed with an FFT at block 120 (after removing the cyclic prefix at block 108 during a sampling period for the cyclic prefix and performing a serial to parallel conversion using converter 118). The number of sampled signal is $2 \times N_{IFFT}$.

After FFT processing at block 120, $N_{IFFT}$ of output signals out of $2 \times N_{IFFT}$ are taken and demodulated at block 122. At this point, the phases of output signals of IFFT are shifted due to the clock mismatch mentioned above. To solve this problem, the output signal for each sub-carrier is divided by $e^{j\alpha i}$, which is an exponential form with the phase calculated above.

Figure 8B:
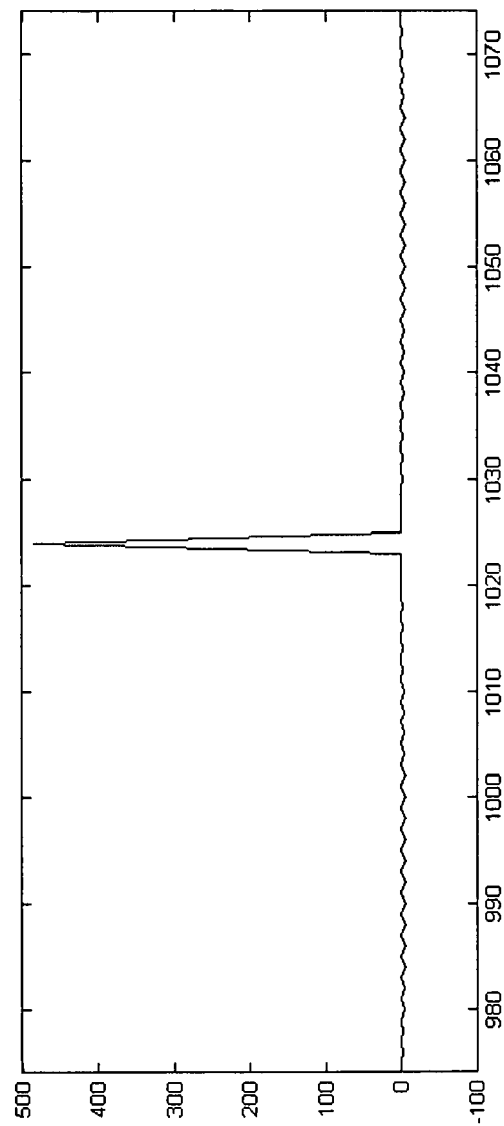
FIG. 8b is an extended figure of FIG. 8a, which illustrates the peak area in detail.

According to the BitMap 126, each signal of each sub-carrier is demodulated with a different type of modulation. With the BICM, instead of minimizing the distance between the received symbol and point in the constellation to find out the actual transmitted symbol in a preferred embodiment, we apply the maximum log-likelihood bit metrics is used at block 112 after a parallel to serial conversion at block 128. The bit metric has 2 rows and $N_{bitmap}$ columns. Bit metrics are obtained as $$\text{metric}(r_t^i = b) = -\min_{s \in \chi_b^i} \|r_t - H_t s\|$$

where $\chi_b^i$ is the set of points whose bit assignment has the binary value b, (0 or 1) at the ith bit position in the M-ary constellation, $r_t$ is the tth received symbol, and $H_t$ is a channel gain of tth sub-carrier. In other words, referring to FIG. 8a to 8b, each bit metric is calculated by selecting the constellation point with the minimum distance over the set $\chi_b^i$. The first row is for the case that the binary number is 0 at the ith position and the second row is for the case that the binary number is 1 at that position. Each column is written the chosen minimum distance at ith position.

This metric is deinterleaved using deinterleaver 114 and then finally decoded using the standard Viterbi algorithm or a Viterbi decoder 116.

While a number of advantageous embodiments have been chosen to illustrate the present invention, it will be understood by those skilled in the art that various changes and modifications can be made herein without departing from the scope of the invention as defined in the appended claims.

What is claimed is:

1. A method of generating a preamble in a Orthogonal Frequency Division Multiplexing (OFDM) communication system, comprises the steps of:
   Inverse Fast Fourier Transforming (IFFT) polyphase code sequences whose number is the same as half of an IFFT size using Hermitian symmetry;
   replicating output signals from the transforming step for a predetermined number of times to provide replicated signals;
   placing the replicated signals in serial;
   convolving a received signal with a polyphase code sequence which is same as a transmitted polyphase code sequence; and
   maintaining the convolving step until a predetermined number of peaks equal to the predetermined number are found, wherein a threshold for deciding whether a peak is found is a number which is a magnitude of a first peak times a constant that is a number between 0.7 and 1.0.

2. The method of claim 1, wherein the predetermined number of times is 4.

3. The method of claim 2, wherein the preamble is further used for synchronization by performing the steps comprising:
   maintaining the convolving step until four peaks are found.

4. The method of claim 3, wherein if the four peaks are found, the synchronization is done successfully.

5. The method of claim 3, wherein synchronization is unsuccessful if the four peaks are not found.

6. The method of claim 1, wherein the preamble is used for channel estimation comprising the steps of:
   taking samples of an IFFT size in advance from a subsequent sample of a sample of each peak;
   generating four sample blocks;
   Fourier-transforming each of the four sample block to provide Fourier-transformed signals;
   taking the Fourier-transformed signals from a first output to an output signal having half of a Fast Fourier Transforming (FFT) size;
   squaring each of the output signals having the half of the FFT size for calculating magnitudes of the signals;
   averaging each of the output signals which are in the same position in the output from the FFT; and
   dividing each average of the output signals by a respective magnitude of the polyphase code sequence transmitted originally.

7. A method of generating a training packet for a signal-to-noise ratio calculation and bit loading, comprising the steps of:
   using polyphase code sequences whose number is same as the half of an Inverse Fast Fourier Transforming (IFFT) size;
   Inverse Fast Fourier Transforming the polyphase code sequence using Hermitian symmetry and IFFT;
   replicating output signals of the IFFT six times;
   placing replicated signals in serial;
   convolving a received signal with a polyphase code sequence which is same as a transmitted polyphase code sequence; and
   maintaining the convolving step until a predetermined number of peaks are found, wherein a threshold for deciding whether a peak is found is a number which is a magnitude of a first peak times a constant that is a number between 0.7 and 1.0.

8. The method of claim 7, wherein the method further comprises the step of synchronizing using the training packet.

* * * * *